(No Model.) 2 Sheets—Sheet 1.

P. W. SHIMER.
MICROSCOPIC SEDIMENT FILTER.

No. 474,267. Patented May 3, 1892.

WITNESSES:

INVENTOR
P. W. Shimer
BY Munn & Co
ATTORNEYS.

(No Model.)  2 Sheets—Sheet 2.
P. W. SHIMER.
MICROSCOPIC SEDIMENT FILTER.
No. 474,267.  Patented May 3, 1892.
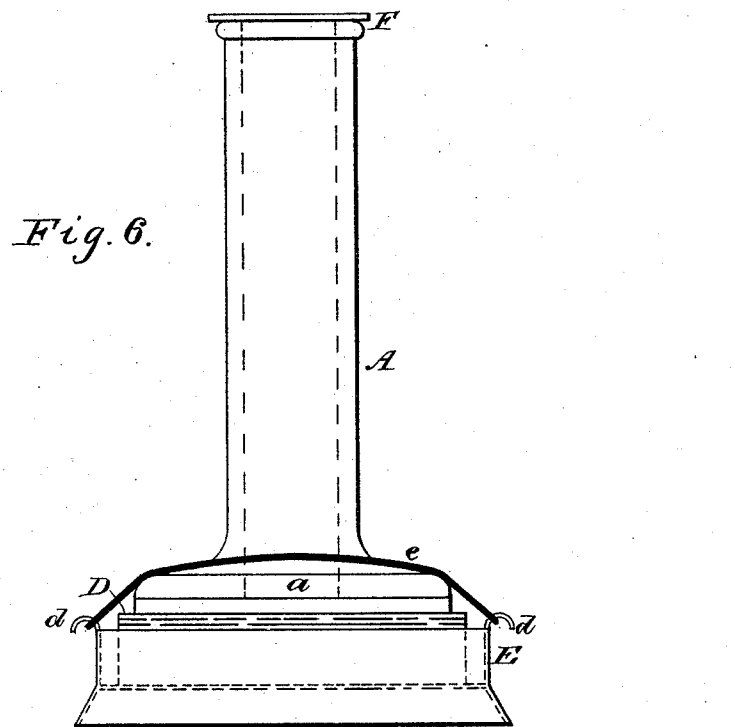
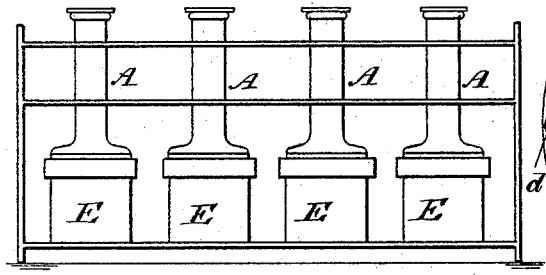
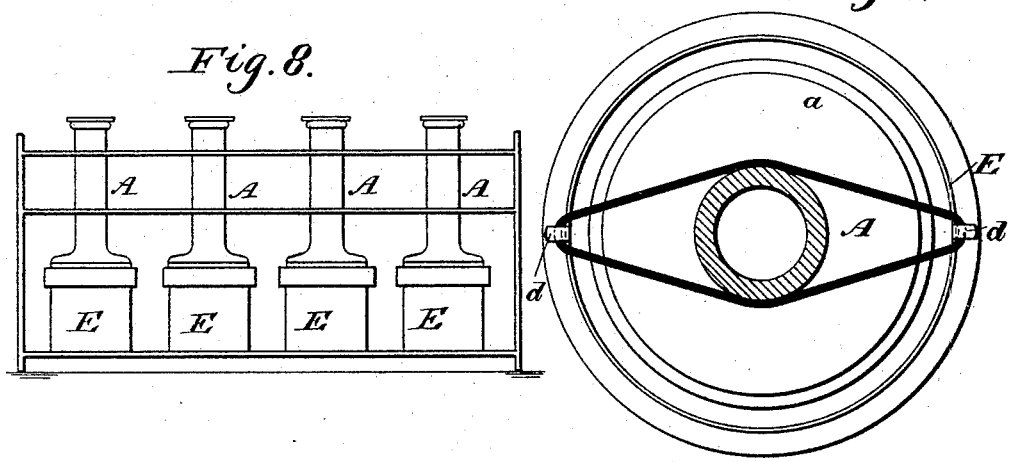
WITNESSES:
INVENTOR
P. W. Shimer
BY Munn & Co.
ATTORNEYS.

UNITED STATES PATENT OFFICE.

PORTER W. SHIMER, OF EASTON, PENNSYLVANIA.

MICROSCOPIC SEDIMENT-FILTER.

SPECIFICATION forming part of Letters Patent No. 474,267, dated May 3, 1892.

Application filed May 8, 1891. Serial No. 392,092. (No model.)

*To all whom it may concern:*

Be it known that I, PORTER W. SHIMER, of Easton, in the county of Northampton and State of Pennsylvania, have invented a new and Improved Microscopic Sediment-Filter, of which the following is a specification, reference being had to the annexed drawings, forming a part thereof, in which—

Figure 1:
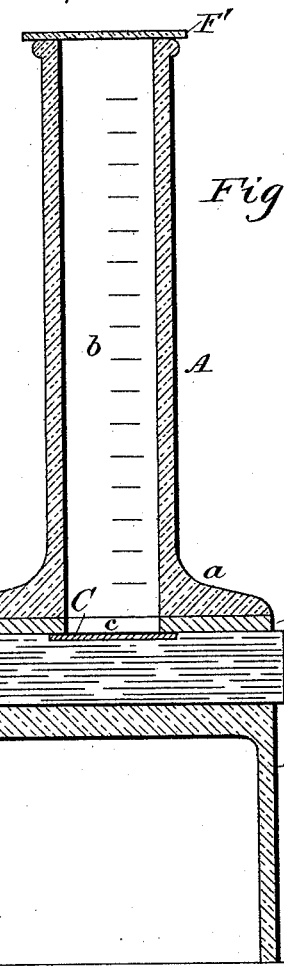
Figure 2:
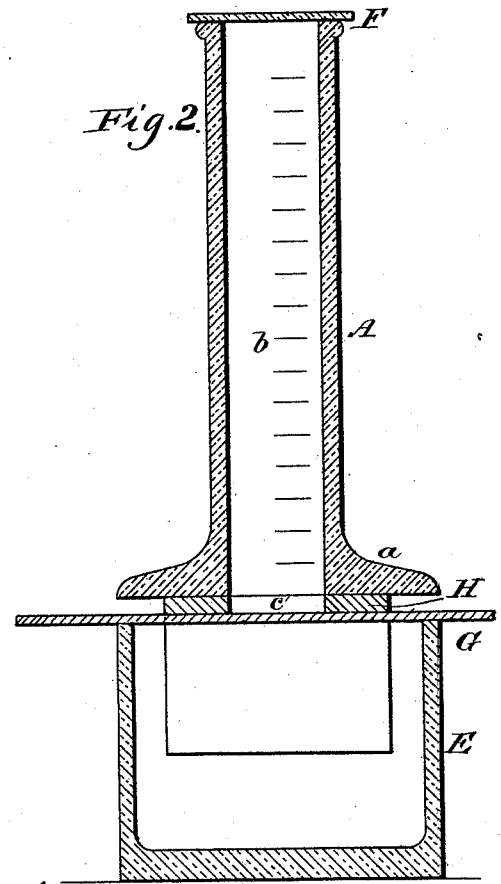
Figure 3:
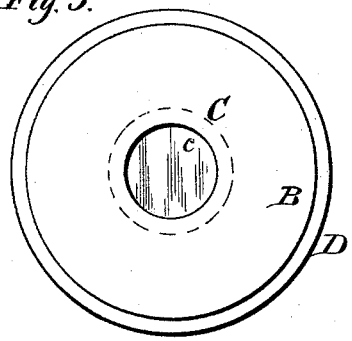
Figure 4:
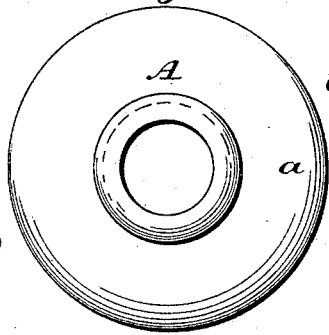
Figure 5:
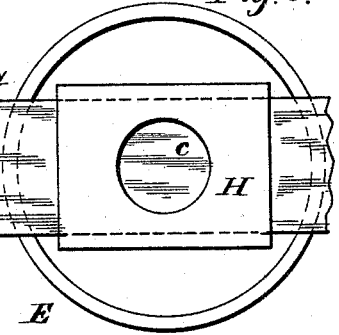

Figure 1 is a vertical transverse section of my microscopic sediment-filter. Fig. 2 is a vertical transverse section of a modified arrangement. Fig. 3 is a plan view of the device shown in Fig. 1 with the settling-tube removed. Fig. 4 is a plan view of the filter shown in Fig. 1. Fig. 5 is a plan view of the filter shown in Fig. 2 with the settling-tube removed. Fig. 6 is a side elevation of the filter with a spring attachment for holding the tube in firm contact with the pad. Fig. 7 is a horizontal section, and Fig. 8 is a side elevation of a series of filters arranged in a frame for holding them upright.

Similar letters of reference indicate corresponding parts in all the views.

The minutely-divided solid matter held in suspension by liquids is usually examined under a microscope either by placing a drop of liquid under a cover-glass or by allowing the sediment to subside to the bottom of a conical vessel and then by means of a glass tube removing a drop of the sediment-bearing liquid for examination. The suspended matter is, however, usually so sparsely disseminated that the former method is not practicable. It therefore becomes necessary to concentrate the sediment.

The method of concentration by settling in a conical glass vessel has several disadvantages, among which are the following: Some suspended matter by reason of its extremely minute state of division or because its specific gravity is nearly the same as that of the liquid settles very slowly or not at all. When the suspended matter has the power of voluntary motion, as is the case of much of the microscopic life of water, this also will not settle to the bottom. By reason of the different size or specific gravity of the different elements the sediment does not settle uniformly. Some elements attach themselves to the sloping sides of the vessel, and thus escape examination. The sediment at the bottom, instead of being uniform, is apt to be disposed in strata. The elements which subside most promptly are at the bottom and the more slowly subsiding are disposed more or less regularly above it. In a drop of sediment thus obtained there is no certainty that all of the different kinds of the suspended matter are represented in it or that the elements are represented in the exact relative proportions in which they exist in the liquid. Another objection to the settling method is that during the time usually allowed for a urinary sediment to settle (twelve to twenty-four hours) serious changes may occur. Some of the more delicate elements may undergo partial or complete decomposition, and fungoid elements may develop during the time this sediment is settling. Crystalline precipitation may also occur.

The object of my invention is to provide a simple and effective device for separating the suspended matter from the liquid by means of filtration.

The invention will be hereinafter fully described, and specifically pointed out in the claims.

According to one method I provide a glass tube A, furnished at its lower end with a flange *a* and squared and ground true or approximately true at opposite ends. The said tube A is provided with graduations *b* for measuring approximately the contents of the tube. To the flanged end of the tube is fitted a plate or plates B of bibulous material, having a central aperture *c* of the same diameter as the bore of the tube A. Under the plate B is placed a microscope cover-glass or slide C, which completely closes the opening *c* and overlaps the material of the plate B a short distance.

In preparing the filter for use the bibulous material B is moistened with water and applied to the flanged end of the tube while in an inverted position, and the cover-glass or slide C is also put in place while the tube A is in an inverted position. The parts being thus arranged are inverted upon a pad D of bibulous material, and the said pad is supported by the inverted vessel E, which in the present case forms the base. The liquid to be filtered is poured into the tube A, and the upper end of the tube is closed by a loosely-fitting glass cover F. The liquid passes out laterally into the bibulous plate B and is drawn by capillarity into the pad D of bibulous material. As the process goes on the solid matter contained by the liquid is deposited upon the cover-glass or slide C, and when the process is completed the glass C is removed, inverted upon a glass slip, and mounted under a microscope in the usual way.

In the form shown in Fig. 2 the vessel E is placed open side up, and upon this is placed the glass slip G. Over the glass slip G is placed an oblong sheet H of bibulous material, which reaches beyond the edges of the slip and hangs down upon opposite sides thereof, the said oblong sheet H having a central aperture $c'$ of the same size as the bore of the tube A, and the tube A rests upon the bibulous sheet H. When the liquid to be filtered is placed in the tube A, it is drawn out by capillarity of the bibulous sheet H, as in the other case, and the filtrate is delivered by the overhanging portions of the sheet to the vessel E, while the solid matter contained by the liquid is deposited upon the face of the slip G.

It is obvious that my improved apparatus may be used for separating out animalcules and solid vegetable and animal matter from water. It is also obvious that by means of this filter water may be examined qualitatively and quantitatively. Pathological urinary sediments may also be thus examined with great advantage.

When it is desirable to hold the base of the tube A in firm contact with the filter-pad, the vessel E is provided on diametrically-opposite sides with hooks $d$, which receive the ends of an elastic rubber band $e$, extending over the flange $a$ and on opposite sides of the tube A, as shown in Figs. 6 and 7. One or more such bands may be used, according to the pressure required.

For some uses a series of these filters may be placed in a suitable frame and arranged for ready examination, as shown in Fig. 8.

Having thus described my invention, I claim as new and desire to secure by Letters Patent—

1. In a microscopic sediment-filter, the combination of a tube, an apertured plate or sheet of bibulous material applied to the lower end of the filter-tube, and a plate for receiving the sediment from the tube, substantially as specified.

2. The combination of a graduated tube, an apertured bibulous sheet or plate, a plate for receiving the deposit, and a receiver for receiving the filtrate, substantially as described.

3. The combination of a tube, an apertured bibulous sheet or plate, a plate for receiving the deposit, and a bibulous pad for receiving the filtrate, substantially as specified.

4. The combination, with the tube A, of the apertured bibulous sheet or plate, a pad for receiving the deposit, and means for connecting the tube with the pad, substantially as set forth.

5. The combination, with the vessel E, provided with the hooks $d$, the pad D, contained by the said vessel, and the flanged tube A, of the elastic band $e$, engaged by the hooks $d$ and extending over the flange $a$ of the tube A, substantially as specified.

6. The combination, with a tube or receptacle and a separate and independent plate to cross the lower open end of the tube or receptacle, of a filtering medium at the lower end of the tube, through which the filtrate may pass out laterally and thus leave the deposit upon the plate for examination, substantially as set forth.

PORTER W. SHIMER.

Witnesses:
W. A. KEMMERER,
M. DRUKHEISER.